Aug. 14, 1934.                E. P. BULLARD                1,970,276
                       UNIT SPINDLE BEARING ASSEMBLY
                           Filed April 27, 1932
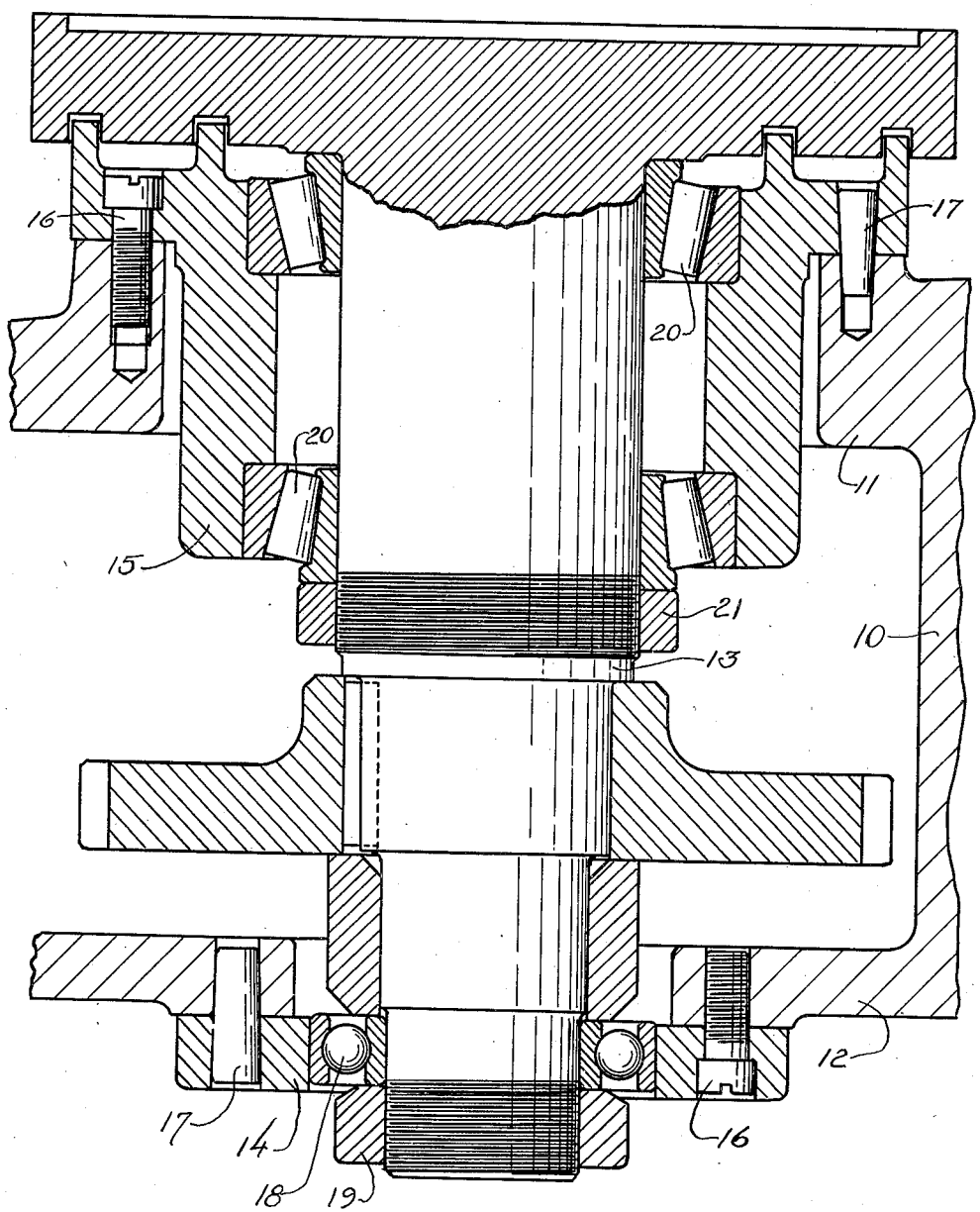
INVENTOR.
E. P. BULLARD
BY
A. T. Sperry
ATTORNEY Patented Aug. 14, 1934

1,970,276

UNITED STATES PATENT OFFICE 1,970,276

UNIT SPINDLE BEARING ASSEMBLY

Edward P. Bullard, Fairfield, Conn., assignor to The Bullard Company, a corporation of Connecticut Application April 27, 1932, Serial No. 607,686

3 Claims. (Cl. 82—30)

This invention relates to machine tools of the type which have a chuck carrying spindle mounted in anti-friction bearings.

An object of the invention is to provide a simple and efficient spindle mounting which will reduce to a minimum the possibility of lateral movement of the spindle under the thrust or pressure of the cutting tool on the work in the chuck.

A further object is to provide an adjustable mounting for the spindle, the adjustment of which will not affect the anti-friction bearing for the spindle.

A further object is to provide a single self-contained bearing assembly for a spindle which includes means for preloading the bearings without exerting pressure upon the supporting members of the spindle.

In the drawing, the figure is a vertical sectional view of one embodiment of the present invention.

Referring to the drawing, the numeral 10 illustrates a support having a pair of apertured flanges which constitute spindle supporting arms 11 and 12 spaced apart something less than the length of the chuck carrying spindle 13. Each aperture is provided with a suitable bearing collar 14 and 15 for housing anti-friction means directly receiving the spindle shaft. Each collar is secured to the respective arm by removable bolts and dowels 16 and 17 so that adjustment of the collar may be had by withdrawal of the bolt and dowel and a redrilling of their receiving holes.

The lower collar 14 receives a suitable roller bearing member 18 of the ball type which is locked with respect to the spindle through the medium of a lock nut 19.

The upper collar 15 carries a pair of spaced anti-friction roller bearings, each bearing being a single row of tapered roller bearings 20, the smaller ends of the rollers being opposite one another. The rollers are secured in position by an adjustable tensioning nut 21 which is threadedly mounted upon the spindle and bears against the inner race of the lower roller assembly. The upper surface of the opposite race abuts the spindle head so that the bearings may be loaded to eliminate chatter by placing them under compression through adjustment of the nut 21. It will be observed that such adjustment will not exert a pressure between the supporting arms of flanges, the whole thrust bearing being self-contained in one of the collars of the assembly. Thus the spindle bearings may be preloaded before assembly with the support and the preloading adjustment and alignment adjusting may be had independently of one another, the lower bearing being merely an alignment bearing which will not have to take any of the end thrust of the spindle.

From the foregoing it will be seen that the invention provides the combination of a support with adjustable spindle bearing housings, one of which consists of a unitary preloading assembly. Obviously, the preloading can be adjusted independently of the alignment adjustment and vice versa. As distinct from contemporary mountings, the adjustment of the bearings so as to place them in compression on the spindle does not act to place the supporting arms under tension and thus the strength and rigidity of the mounting is enhanced. Another feature is that the tapered bearings of the cooperating pair are housed within a single cup-like collar, thus providing a unit highly advantageous from the standpoint of manufacture and assembly.

Having thus set forth the nature of my invention, what I claim is:

1. In a machine tool, the combination with a work spindle carrier having a pair of apertured supporting arms of a unitary pre-loaded work spindle and bearing assembly, loosely received through the apertures of the arms, and including a flange adapted to be positioned upon the surface of one of the arms, and to be adjustably secured thereto, so as to provide an adjustable securement for the spindle.

2. In a machine tool, the combination of a pair of spaced-apertured arms of a spindle bearing assembly, loosely fitting through the apertures of the arms, and including a pair of space-bearing assemblies, each including a flange adapted to lie against the outer surfaces of the arms, and means for adjustably securing said flanges to said arms to provide an adjustable bearing spindle arrangement.

3. In a machine tool, the combination of a spindle carrier having space-walls provided with alined apertures of a spindle assembly, loosely secured through said apertures, said assembly including a flanged bearing retainer adapted to lie over the face of one of the arms and to be adjustably secured thereto, a pair of anti-friction bearings between said retainer and said spindle, and means for pre-loading the bearings independent of the relation of said retainer to said arms.

EDWARD P. BULLARD.